United States Patent
Wasserfallen et al.

(10) Patent No.: US 11,261,337 B2
(45) Date of Patent: Mar. 1, 2022

(54) METHOD FOR COATING METAL SURFACES OF SUBSTRATES, AND OBJECTS COATED ACCORDING TO SAID METHOD

(71) Applicant: Chemetall GmbH, Frankfurt am Main (DE)

(72) Inventors: Daniel Wasserfallen, Mainz (DE); Michael Schwamb, Frankfurt (DE); Aliaksandr Frenkel, Frankfurt (DE); Vera Sotke, Frankfurt am Main (DE); Wolfgang Bremser, Paderborn (DE); Martin Droll, Schlangen (DE); Ron Eilinghoff, Frankfurt (DE); Stephanie Gerold, Paderborn (DE); Evgenija Niesen, Soest (DE); Lars Schachtsiek, Paderborn (DE); Manuel Traut, Hamm (DE); Oliver Seewald, Marsberg (DE)

(73) Assignee: CHEMETALL GMBH, Frankfurt am Main (DE)

( * ) Notice: Subject to any disclaimer, the term of this patent is extended or adjusted under 35 U.S.C. 154(b) by 0 days.

(21) Appl. No.: 16/512,919

(22) Filed: Jul. 16, 2019

(65) Prior Publication Data

US 2019/0382615 A1    Dec. 19, 2019

Related U.S. Application Data

(62) Division of application No. 14/646,973, filed as application No. PCT/EP2013/074575 on Nov. 25, 2013, now Pat. No. 10,400,135.

(30) Foreign Application Priority Data

Nov. 26, 2012  (DE) .......................... 102012221520.4

(51) Int. Cl.
| | | |
|---|---|---|
| C09D 7/61 | (2018.01) | |
| C09D 175/04 | (2006.01) | |
| B05D 7/14 | (2006.01) | |
| B05D 7/16 | (2006.01) | |
| B05D 7/00 | (2006.01) | |
| C09D 133/08 | (2006.01) | |
| C09D 163/00 | (2006.01) | |
| C09D 7/40 | (2018.01) | |
| C08F 2/18 | (2006.01) | |
| C09D 5/08 | (2006.01) | |
| C09D 101/02 | (2006.01) | |
| C09D 103/02 | (2006.01) | |
| C09D 103/12 | (2006.01) | |

(Continued)

(52) U.S. Cl.
CPC ............. *C09D 7/61* (2018.01); *B05D 7/148* (2013.01); *B05D 7/16* (2013.01); *B05D 7/51* (2013.01); *B05D 7/52* (2013.01); *C08F 2/18* (2013.01); *C09D 5/084* (2013.01); *C09D 7/67* (2018.01); *C09D 7/68* (2018.01); *C09D 101/02* (2013.01); *C09D 103/02* (2013.01); *C09D 103/12* (2013.01); *C09D 105/00* (2013.01); *C09D 105/02* (2013.01); *C09D 105/04* (2013.01); *C09D 105/06* (2013.01); *C09D 105/08* (2013.01); *C09D 105/12* (2013.01); *C09D 133/08* (2013.01); *C09D 163/00* (2013.01); *C09D 175/04* (2013.01); *C09D 189/00* (2013.01); *C09D 189/06* (2013.01); *C09D 197/005* (2013.01); *C23C 18/1241* (2013.01); *C23C 18/1254* (2013.01); *C23C 22/34* (2013.01); *C23C 22/74* (2013.01); *C08L 2205/025* (2013.01); *C09D 133/06* (2013.01)

(58) Field of Classification Search
CPC .......... C09D 175/04; C09D 7/61; C09D 7/67; C09D 7/68; C09D 5/084; C09D 101/02; C09D 103/02; C09D 103/12; C09D 105/00; C09D 105/04; C09D 105/06; C09D 105/08; C09D 105/12; C09D 133/08; C09D 163/00; C09D 189/00; C09D 189/06; C09D 197/005; C09D 133/06; B05D 7/148; B05D 7/16; B05D 7/51; B05D 7/52; C08F 2/18; C23C 18/1241; C23C 18/1254; C23C 22/34; C23C 22/74; C08L 2205/025
See application file for complete search history.

(56) References Cited

U.S. PATENT DOCUMENTS

| | | |
|---|---|---|
| 5,543,082 A | 7/1996 | Dollman et al. |
| 5,829,107 A | 11/1998 | Wimmenauer et al. |

(Continued)

FOREIGN PATENT DOCUMENTS

| | | |
|---|---|---|
| CN | 101379217 A | 3/2009 |
| CN | 101395299 A | 3/2009 |

(Continued)

OTHER PUBLICATIONS

English translation of EP 1779392.*

*Primary Examiner* — Robert S Walters, Jr.
(74) *Attorney, Agent, or Firm* — Armstrong Teasdale LLP

(57) ABSTRACT

A coating, a method for coating surfaces, and the coated surfaces. The method includes providing a substrate with a cleaned metal surface; contacting and coating the metal surface with an aqueous composition having a ph of from 0.5 to 7.0 and in the form of a dispersion and/or a suspension; optionally rinsing the organic coating; and drying and/or baking the organic coating, or optionally drying the organic coating and coating same with a similar or another coating composition thereto. The composition contains a complex fluoride in a quantity of $1.1 \cdot 10^{-6}$ mol/l to 0.30 mol/l based on the cations. An anionic polyelectrolyte in a quantity of 0.01 to 5.0 wt % based on the total mass of the resulting mixture is added to an anionically stabilized dispersion made of film-forming polymers and/or a suspension made of film-forming inorganic particles.

1 Claim, No Drawings

(51) Int. Cl.

| | | |
|---|---|---|
| *C09D 105/00* | (2006.01) |
| *C09D 105/02* | (2006.01) |
| *C09D 105/04* | (2006.01) |
| *C09D 105/06* | (2006.01) |
| *C09D 105/08* | (2006.01) |
| *C09D 105/12* | (2006.01) |
| *C09D 189/00* | (2006.01) |
| *C09D 189/06* | (2006.01) |
| *C09D 197/00* | (2006.01) |
| *C23C 18/12* | (2006.01) |
| *C23C 22/34* | (2006.01) |
| *C23C 22/74* | (2006.01) |
| *C09D 133/06* | (2006.01) |

(56) References Cited

U.S. PATENT DOCUMENTS

| | | |
|---|---|---|
| 5,859,106 A | 1/1999 | Jones et al. |
| 5,905,105 A | 5/1999 | Jones et al. |
| 7,294,362 B2 | 11/2007 | Tanaka et al. |
| 7,923,423 B2 * | 4/2011 | Walker .............. C11D 7/261 510/175 |
| 8,524,323 B2 | 9/2013 | Nagai et al. |
| 2005/0103229 A1 | 5/2005 | Tanaka et al. |
| 2008/0063970 A1 * | 3/2008 | Kikawa ............ G03G 9/09314 430/110.2 |
| 2008/0280046 A1 * | 11/2008 | Bryden ................ C23C 22/50 427/327 |
| 2013/0344310 A1 * | 12/2013 | Wasserfallen ........... B05D 7/16 428/216 |

FOREIGN PATENT DOCUMENTS

| | | | |
|---|---|---|---|
| CN | 102271824 A | 12/2011 | |
| EP | 1779392 A1 * | 5/2007 | .............. B82Y 30/00 |
| EP | 2154266 A1 | 2/2010 | |
| WO | 9412570 A1 | 6/1994 | |
| WO | 0231065 A1 | 4/2002 | |
| WO | 2005001158 A1 | 1/2005 | |
| WO | 2011093282 A1 | 8/2011 | |
| WO | WO-2012034976 A1 * | 3/2012 | ............ C25D 13/00 |

\* cited by examiner

METHOD FOR COATING METAL SURFACES OF SUBSTRATES, AND OBJECTS COATED ACCORDING TO SAID METHOD

This application is a divisional application of U.S. patent application Ser. No. 14/646,973 filed Jun. 2, 2015, which is a § 371 of International Application No. PCT/EP2013/074575 filed Nov. 25, 2013, and claims priority from German Patent Application No. 10 2012 221 520.4 filed Nov. 26, 2012, the entire contents of which are hereby incorporated by reference herein.

The invention relates to a method for coating surfaces, a corresponding coating, and the use of objects coated according to this method. There are numerous methods of producing homogeneous coating on, in particular, metal surfaces by means of a dipping method. Preferably, the techniques described below can be used for the production of, in particular, anticorrosion coatings predominantly composed of an organic matrix and/or organic and/or inorganic additive components.

The classical methods rely on the use of the rheological properties of the formulations being used, in order to achieve a complete coating of an assembled workpiece. Despite the possibility of reducing the accumulation of coating material at critical points by continuously rotating the workpiece in question after the dipping process, it is not possible with this method to achieve a completely homogeneous coating. Additionally, defects such as blistering and boils can occur in places with higher coating proportions during the drying and/or cross-linking process, and these defects affect the quality of the coating overall.

The electrophoretic method avoids this problem by making use of an electric current to deposit a uniform coating in the dipping. This method offers successful production of homogeneous coatings on metallic workpieces. The deposited coating exhibits superior adhesion to the metallic substrate in the wet state. Without removal of the coating, it is possible to treat the workpiece in a subsequent rinsing step. This means that the previously mentioned places on the workpiece that are difficult to reach are freed from surviving coating solution, and thus no defects can arise during the drying process. This technique has a disadvantage in that not only do the amount of electrical energy and required dipping tanks lead to an increase in costs, but also edge thinning occurs, because electrical fields are created non-homogeneously at macroscopic edges, and the edges are non-uniformly and possibly even incompletely coated. Voids also need to be avoided in the construction of the workpieces, because an effect similar to the phenomenon of the Faraday cage occurs at these points. Due to the reduction of the electrical field strengths that are necessary for the deposition, the method may result either in the failure to apply a coating or in the application of only a greatly reduced coating to such areas on the workpiece (a coverage problem), leading to deterioration of the coating quality. In addition, in electric dip coating (EDC), such as, for example, cathodic dip coating (CDC), this technique also has the following disadvantages: A corresponding dip bath is built at great expense, along with all the electrical and mechanical equipment for temperature control, power supply, and electrical insulation, the circulating equipment and added equipment, up to the disposal of the anolyte acid that forms in the electrolytic coating, and along with ultrafiltration for coat recycling, as well as control devices. The process management requires a very high technical effort also, due to the high current intensities and energy levels as well as with the equalization of the electrical parameters on the bath volume, the precise adjustment of all the process parameters, and the maintenance and cleaning of the system.

The known autodeposition methods are based on an electroless concept comprising a pickling attack of the substrate surface being used, in which metal ions are dissolved out of the surface, and an emulsion coagulates due to the concentration of metallic ions at the resulting interface. Though these methods do not have the aforementioned limitation of the electrolytic method with respect to the Faraday cage effect, the coatings produced in the process must be fixed after the first activation step, in an elaborate multi-stage dipping process. Moreover, the pickling attack leads to an unavoidable impurity of the active zone due to metal ions, which must be removed from the zone. The method is also based on a chemical deposition process which is not self-regulating and, even if necessary, cannot be aborted such as by, for example, switching off the electric current in the electrolytic method. Thus, the formation of an overly thick layer is unavoidable with a longer residence time of the metallic substrate in the active zones.

It is a long-pursued desire to efficiently and inexpensively form homogeneous coatings in a dip process in order to provide coatings that are as unbroken as possible and substantially level therefrom, at a greater thickness.

The present invention therefore addresses the problem of providing a method with which it is possible to deposit a coat formulation homogeneously and with comprehensive coverage in a simple manner on metallic surfaces, via a liquid system and, if necessary, even in a rinse-resistant manner. The present invention also addresses the problem of providing the simplest possible method therefor.

The problem is solved by a method for coating metallic surfaces of substrates, comprising the steps of or consisting of the steps of:

I. providing a substrate with a cleaned metal surface;
II. contacting and coating metal surfaces with an aqueous composition in the form of a dispersion and/or a suspension;
III. optionally rinsing the organic coating; and
IV. drying and/or baking the organic coating, or
V. optionally drying the organic coating and coating same with a similar or additional coating composition prior to drying and/or baking, wherein the coating process in step II is carried out using an aqueous composition in the form of a dispersion and/or a suspension, said composition containing a complex fluoride selected from the group consisting of hexa- or tetrafluorides of the elements titanium, zirconium, hafnium, silicon, aluminum, and/or boron in a quantity of $1.1 \; 10^{-6}$ mol/l to 0.30 mol/l based on the cations; wherein at least one anionic polyelectrolyte, in a quantity of 0.01 to 5.0 wt % based on the total mass of the resulting mixture, is added to an anionically stabilized dispersion made of film-forming polymers and/or a suspension made of film-forming inorganic particles with a solid content of 2 to 40 wt % and a mean particle size of 10 to 1,000 nm, said dispersion and/or suspension being stable in the pH value range of 0.5 to 7.0; wherein the aqueous composition has a pH value ranging from 0.5 to 7.0 and forms a coating on the basis an ionogenic gel which binds cations dissolved out from the metal surface; and wherein these cations originate from a pretreatment stage and/or from the contacting process in step II. The inventive addition of complex fluorides leads to largely homogeneous coatings having a dry film thickness ranging from 20 to 100 μm on galvanized steel sheets, and to dry film thicknesses greater than 1 μm on cold-rolled steel sheets or aluminum.

Preferably, the complex fluoride is used in an amount of $1.1 \cdot 10^{-5}$ mol/l to 0.15 mol/l, preferably $1.1 \cdot 10^{-4}$ mol/l to 0.05 mol/l based on the cations, wherein the aqueous composition has a pH value ranging from 1.0 to 6.0, particularly preferably from 1.5 to 5.0.

The coating process according to the invention exhibits a single-layer structure, wherein either a more or less homogeneous coating or a coating is formed or may be present, which has somewhat stronger accumulation of the particles near the metallic surface. The substrates comprising a metallic surface that are intended to be coated are to be understood, according to the invention, to be metals, metal-coated surfaces, or primer-pretreated metal surfaces, from which metal cations can still be dissolved out. In particular, for the purposes of the present application, the term "surface(s) intended to be coated" encompasses surfaces of metallic objects and/or metallic particles, which optionally may be pre-coated, for example, with a metallic coating such as, for example, based on zinc or zinc alloy, and/or with at least one coating of a pre-treatment or treatment composition such as, for example, based on chromate, $Cr^{3+}$, a Ti-compound, a Zr compound, silane/silanol/siloxane/polysiloxane, and/or an organic polymer.

Metallic materials may refer to fundamentally all kinds of metallic materials, in particular those of aluminum, iron, copper, titanium, zinc, magnesium, tin and/or alloys containing aluminum, iron, calcium, copper, magnesium, nickel, chromium, molybdenum, titanium, zinc and/or tin, wherein these metallic materials may be used adjacently and/or in succession. The material surfaces may also optionally be and/or have been pre-coated, for example, with zinc or aluminum, and/or a zinc-containing alloy.

As objects intended to be coated, it would be possible to use fundamentally all kinds of objects that are composed of a metallic material or are provided with at least one metallic coating, in particular metal-coated polymeric materials or fiber-reinforced polymeric materials. Particularly preferred objects are, in particular, strips (coils), sheets, parts such as small parts, bonded components, intricately shaped components, moldings, rods, and/or wires.

The term "electroless coating" for the purposes of the present application means that in coating with the solution and/or dispersion (=suspension and/or emulsion)-containing composition, an electric voltage of less than 100 V is applied, in contrast to the known electrolytic methods for producing the subsequent coating from the outside.

Preferably, the invention relates to method in which at least one anionic polyelectrolyte is selected from the groups containing or composed of: a) polysaccharides based on glycogens, amyloses, amylopectins, calloses, agar, algins, alginates, pectins, carrageenans, celluloses, chitins, chitosans, curdlans, dextrans, fructans, collagens, gellan gum, gum arabic, starches, xanthans, tragacanth, karayan gum, tara grain meal, and glucomannans; b) of natural origin based on polyamino acids, collagens, polypeptides, and lignins; and/or c) a synthetic, anionic polyelectrolyte based on polyamino acids, polyacrylic acids, polyacrylic acid copolymers, acrylamide copolymers, lignins, polyvinylsulfonic acid, polycarboxylic acids, polyphosphoric acids, or polystyrenes.

Preferably, the method according to the invention is one in which the aqueous composition and/or the organic coating produced therefrom contains at least one kind of cation selected from those based on cationically active salts selected from the group consisting of melamine salts, nitroso salts, oxonium salts, ammonium salts, salts with quaternary nitrogen cations, salts of ammonium derivatives, and metal salts of Al, B, Ba, Ca, Cr, Co, Cu, Fe, Hf, In, K, Li, Mg, Mn, Mo, Na, Nb, Ni, Pb, Sn, Ta, Ti, V, W, Zn and/or Zr.

The term "copolymers" for the purpose of the present application describes polymers that are composed of two or more different types of monomeric units. Copolymers can be divided here into five classes, as shall be illustrated with reference to a binary copolymer that is composed of two different comonomers A and B:

1. Random copolymers, in which the distribution of the two monomers in the chain is random (AABABBBABAABBBABBABAB . . . );
2. Gradient copolymers, similar in principle to random copolymers, except with a variable proportion of one monomer in the course of the chain (AAAAAABAABBAABABBBAABBBBBB);
3. Alternating copolymers, with a regular arrangement of the monomers along the chain (ABABABABABABABABABAB . . . );
4. Block copolymers, which are composed of long sequences or blocks of each monomer (AAAAAAAAABBBBBBBBBBBB . . . ), with further subdivision into diblock, triblock, and multiblock copolymers in accordance with the number of blocks; and
5. Graft copolymers, with which blocks of one monomer are grafted onto the scaffold (backbone) of another monomer.

The term "derivatives" for the purposes of the present application designates a derived substance structurally similar to a corresponding basic substance. Derivatives are substances where, in place of an H atom or a functional group, the molecules thereof possess another atom or another atomic group, or where one or more atoms/atomic groups have been removed.

The term "polymer(s)" for the purposes of the present application signifies monomer(s), oligomer(s), polymer(s), copolymer(s), block copolymer(s), graft copolymer(s), mixtures thereof, and compounding thereof on an organic and/or substantially organic basis. Generally, for the purposes of the present application, the "polymer(s)" is/are present predominantly or wholly as polymer(s) and/or copolymer(s).

Particularly preferably, the method according to the invention is one in which the aqueous composition and/or the organic coating produced therefrom has a content of organic particles based on polyacrylates, polyurethanes, polyepoxides, and/or hybrids thereof.

So-called polyacrylate-polyurethane hybrid resins can be distinguished by type into hybrid systems that are generated by pure mixing of the different dispersions (blends, or formulations), those that comprise a chemical bond between the different polymer types, and those in which the different polymer classes form interpenetrating networks (IPNs).

Generally, such polyurethane-polyacrylate hybrid dispersions are produced by an emulsion polymerization of a vinyl polymer ("polyacrylate") in an aqueous polyurethane dispersion. It is, however, also possible to produce the polyurethane polyacrylate hybrid dispersion as a secondary dispersion.

Aqueous polyacrylate polyepoxide hybrid dispersions are generally produced by addition reactions of a bifunctional epoxide with bifunctional amine monomeric components and a subsequent reaction with a polyacrylate having sufficient carboxyl functions. The water dispersibility can then, as with the polyurethane secondary dispersions, be achieved by, for example, carboxylate groups that have been converted with amines into anionic groups and subsequent dispersion in water.

In addition to polyurethane and polyepoxide components, hybrid dispersions for forming a layer on the substrate may preferably also contain organic polymers and/or copolymers based on polyvinyl alcohols, polyvinyl acetates, polybutyl acrylates, and/or other acrylic esters. Acrylic acid esters are esters that are derived from acrylic acid ($CH_2=CH-COOH$) and thus bear the functional group ($CH_2=CH-COOR$). Methyl acrylate, ethyl acrylate, butyl acrylate and ethylhexyl acrylate are produced in large quantities, among others. The main use of acrylic acid esters is in homo- and copolymers, which include, for example, acrylic acid, acrylamides, methacrylates, acrylonitrile, fumaric acid, itaconic acid, maleates, vinyl acetate, vinyl chloride, styrene, butadiene and unsaturated polyesters, polyepoxide esters, polyacrylamides, polyacrylic acids, polycarbonates, polyesters, polyethers, polystyrene butadienes, poly(meth)acrylic acid esters, polyvinyl acetate copolymers with acrylic acid esters and/or copolymers with dibutyl maleate and/or with vinyl esters of at least one tertiary saturated monocarboxylic acid, polyethylenes, polyvinyl chlorides, polyacrylonitriles, polyepoxides, polyurethanes, polyacrylates, polymethacrylates, polyesters, polyamides, polytetrafluoroethylenes, polyisobutadienes, polyisoprenes, silicones, silicone rubbers, and/or derivatives thereof. These are present at, in particular, at least 50 wt % of the solid and active substances in the aqueous composition.

The term "pretreatment" refers to a treatment (=contacting the surfaces intended to be coated, with a generally liquid composition) in which subsequently, optionally after a later coating, another coating is applied in order to protect the sequence of layers and the object, such as, for example, at least one coat.

In a previous pre-treatment, prior to activation of a surface with an activating agent that is intended to help electrostatically charge the surface, the surfaces intended to be treated may, where necessary, first be cleaned with an alkaline solution and optionally contacted with a composition for pretreatment, the latter in particular in order to form a conversion layer. Then, the surfaces having been thus treated and/or coated may optionally be coated with a primer and/or with an optionally deformable protection layer, in particular with an anti-corrosion primer, and/or may optionally be oiled. The oiling serves in particular to provide temporary protection of the treated and/or coated (especially metallic) surfaces.

As a pretreatment, fundamentally any kind of pretreatment is possible: examples that can be used include aqueous pretreatment compositions based on phosphate, phosphonate, silane, silanol/siloxane/polysiloxane, a lanthanide compound, a titanium compound, a hafnium compound, a zirconium compound acid, a metal salt, and/or an organic polymer.

Further treatment of these coated substrates can, where necessary, involve an, in particular, alkaline cleaning, irrespective of whether an oil has been applied or not.

A coating with an anticorrosion primer such as, for example, a welding primer may enable additional corrosion protection, especially in voids and parts of a substrate that are hard to reach, deformability and/or joinability, for example, in folding, adhering, and/or welding. In industrial practice, an anti-corrosion primer could be used in particular if, after the coating with the anti-corrosion primer, the thus-coated substrate, such as, for example, a sheet is formed and/or joined with additional components, and if other coatings are only applied thereafter. Generally a considerably improved corrosion protection is produced if, in this process sequence, an anti-corrosion primer is additionally applied under the activation layer and under the particle coating.

The term "substantially rinse-resistant" for the purposes of the present invention signifies that under the conditions of the respective system and method sequence, the respective final coating is not completely removed by a rinse process (=rinsing), so that a coating can be produced, preferably an unbroken coating.

In the method according to the invention, a wide variety of particle types, particle sizes, and particle shapes can be used as the particles.

As particles in the aqueous composition for forming the layer, it is possible to use preferably oxides, hydroxides, carbonates, phosphates, phosphosilicates, silicates, sulfates, organic polymers including copolymers and derivatives thereof, waxes and/or compounded particles, in particular those based on anti-corrosive pigments, organic polymers, waxes and/or compounded particles, and/or mixtures thereof. These particles preferably have particle sizes ranging from 5 nm to 15 μm, more preferably from 20 nm to 1 μm, particularly preferably from 50 nm to 500 nm. They are preferably water-insoluble particles.

Compounded particles have a mixture of at least two different substances in one particle. Compounded particles can often include other substances having very different properties. Compound particles may, for example, either partially or completely contain the composition for a coat, optionally even with a content of non-particulate substances such as, for example, surfactants, defoamers, dispersants, coat auxiliaries, other types of additives, a dye, a corrosion inhibitor, a weakly water-soluble anticorrosion pigment, and/or other substances which are customary and/or known for such mixtures. Such coat components may be suitable and or frequently used, for example, for organic coatings for deformation, anti-corrosion primers and other primers, colored coats, fillers, and/or clear coats.

An anti-corrosion primer typically comprises electrically conductive particles and is electrically weldable. Generally, in this case, it is often preferred to use: a) a mixture of chemically and/or physically different types of particles, b) particles, aggregates, and/or agglomerates of chemically and/or physically different types of particles; and/or c) compounded particles in the composition and/or in the particle layer formed therefrom. Often preferably, the particle-containing composition and/or the particle layer formed therefrom comprise(s) at least one kind of particles and, in addition thereto, also at least one non-particulate substance, especially additives, colorants, corrosion inhibitors and/or poorly water-soluble anti-corrosion pigments. Colored and/or optionally even a limited proportion of electrically conductive particles, in particular based on fullerenes and other carbon compounds having graphite-like structures, and/or carbon black, optionally also as nanocontainers and/or nanotubes, can be included as particles in the composition and/or in the particle layer produced therefrom. On the other hand, coated particles, chemically and/or physically modified particles, core-shell particles, compounded particles made of different substances, encapsulated particles, and/or nanocontainers can be used here in particular as particles in the composition and/or in the coating produced therefrom.

In the method according to the invention, preferably, the particle-containing composition, the particle layer formed therefrom, and/or the coating formed therefrom by, for example, film formation and/or cross-linking contain(s) at least one type of particles and, in addition thereto, respectively at least one dye, one coloring pigment, one anticorrosion pigment, one corrosion inhibitor, one conductive pigment, one further type of particles, one silane/silanol/siloxane/polysiloxane/silazane/polysilazane, one coat additive, and/or one additive such as, for example, at least one surfactant, one defoamer and/or one dispersing agent.

In the method according to the invention, preferably, the composition and/or the coating formed therefrom comprises at least one type of particles and optionally at least one non-particular substance, and, in addition thereto, partially or completely a chemical composition for a primer, a coat such as, for example, for a filler, a top coat, and/or a clear coat.

As additions to the organic polymers of the particles, it is recommended in many embodiments to have pigments and/or additives, such as are commonly used in coats and/or primers.

A film formation can be improved through the use of thermoplastic polymers and/or through the addition of substances that serve as temporary plasticizers. Coalescing agents act as specific solvents that soften the surface of the polymer particles and thus enable fusion thereof. Here, it is advantageous if these plasticizers remain, on the one hand, long enough in the aqueous composition in order to be able to have an effect on the polymer particles, and then evaporate and thus escape from the film. Furthermore, it is advantageous if also a residual water content is present sufficiently long during the drying process.

Particularly advantageous coalescing agents are so-called long-chain alcohols, especially those having 4 to 20 C atoms, such as:
a butanediol,
a butyl glycol,
a butyl diglycol,
an ethylene glycol ether such as
ethylene glycol monobutyl ether,
ethylene glycol monoethyl ether,
ethylene glycol monomethyl ether,
ethyl glycol propyl ether,
ethylene glycol hexyl ether,
diethylene glycol methyl ether,
diethylene glycol ethyl ether,
diethylene glycol butyl ether,
diethylene glycol hexyl ether, or a
polypropylene glycol ether such as
propylene glycol monomethyl ether,
dipropylene glycol monomethyl ether,
tripropylene glycol monomethyl ether,
propylene glycol monobutyl ether,
dipropylene glycol monobutyl ether,
tripropylene glycol monobutyl ether,
propylene glycol monopropyl ether,
dipropylene glycol monopropyl ether,
tripropylene glycol monopropyl ether,
propylene glycol phenyl ether,
trimethyl pentanediol diisobutyrate,
a polytetrahydrofuran,
a polyether polyol and/or a polyester polyol.

Cross-linking may be performed, for example, with certain reactive groups such as, for example, isocyanate, isocyanurate, and/or melamine groups.

Preferably, the subsequent coating is dried in such a manner that, in particular, existing organic polymer particles can form a film, so that a largely or completely homogeneous coating is formed. The drying temperatures can, in many embodiments, be selected so as to be so high that the organic polymeric constituents can be cross-linked.

In the method according to the invention, it is preferred in a large number of embodiments for a particle layer that mainly contains organic particles to be formed and, for example, made into a film and/or cross-linked in drying. This film formation takes place in some embodiments even without the presence of coalescing agents.

Here, the particles of the coating, in particular when predominantly or wholly present as organic polymers, may preferably be formed into a substantially unbroken coating or into an unbroken coating, especially during drying. It is often preferred here for the drying temperature of a coating that is composed predominantly or wholly of organic polymers to be selected so as to form a substantially unbroken coating or an unbroken coating. Where necessary, at least one coalescing agent may be added for the purpose of film formation, in particular one that is based on at least one long-chain alcohol. In embodiments comprising a plurality of particle layers superimposed over one another, preferably all of the particle layers are applied first and are thereafter formed into a film or cross-linked together.

The content of at least one coalescing agent in the aqueous composition—especially in the bath—may be 0.01 to 50 g/L based on the solids, including the active ingredients, and may preferably be 0.08 to 35 g/L, particularly preferably 0.2 to 25 g/L. The weight ratio of the contents of organic film former to the content of coalescing agents in the aqueous composition.

Here, it is often preferred for the drying, film formation, and/or cross-linking to take place in the temperature range of 5° C. to 350° C., preferably 80° C. to 200° C., particularly preferably in the temperature range of 150° C. to 190° C. based on the furnace temperature and/or based on the peak metal temperature (PMT). The selected temperature range is largely dependent on the type and amount of the organic component and optionally also the inorganic components, and optionally also on the film formation temperatures and/or cross-linking temperatures thereof.

Preferably, the invention relates to a method in which the aqueous composition and/or the organic coating produced therefrom comprises a content of at least one complexing agent for metal cations, or a polymer that is modified so as to complex metal cations.

Particularly preferably, the method according to the invention is one in which the aqueous composition and/or the organic coating produced therefrom comprises a content of at least one complexing agent selected from those based on maleic acid, alendronic acid, itaconic acid, citraconic acid, or mesaconic acid, or the anhydrides or semi-esters of these carboxylic acids.

Advantageously, the aqueous composition and/or the organic coating produced therefrom comprises at content of at least one emulsifier.

It is particularly preferably for the aqueous composition and/or the organic coating produced therefrom to comprise a content of at least one emulsifier selected from those based on anionic emulsifiers.

Preferably, the aqueous composition and/or the organic coating produced therefrom contains a mixture of at least two different anionic polyelectrolytes.

Particularly preferably, the aqueous composition and/or the organic coating produced therefrom contains a mixture of two pectins.

Further preferably, the aqueous composition and/or the organic coating produced therefrom contains at least one anionic polysaccharide selected from those having a degree of esterification of the carboxyl function in the range of 5 to 75% based on the total number of alcohol and carboxyl groups.

Especially preferably, the aqueous composition and/or the organic coating produced therefrom contains at least one anionic polysaccharide and/or at least one further anionic polyelectrolyte selected from those having a molecular weight in the range of 500 to 1,000,000 g/mol$^{-1}$.

Preferably, the aqueous composition and/or the organic coating produced therefrom contains at least one anionic polysaccharide and/or at least one further anionic polyelectrolyte selected from those having a degree of amidation of the carboxyl functions in the range of 1 to 50%, and a degree of epoxidation of the carboxyl functions of up to 80%.

It is particularly preferable in the method according to the invention for the anionic polyelectrolytes to have been modified or be modified with the binding of intermediary binding groups selected from the group consisting of chemical groups of multifunctional epoxides, isocyanates, primary amines, secondary amines, tertiary amines, quaternary amines, amides, imides, imidazoles, formamides, Michael reaction products, carbodiimides, carbenes, cyclic carbenes, cyclocarbonates, multifunctional carboxylic acids, amino acids, nucleic acids, methacrylamides, polyacrylic acids, polyacrylic acid derivatives, polyvinyl alcohols, polyphenols, polyols having at least one alkyl and/or aryl, caprolactam, phosphoric acids, phosphoric acid esters, epoxide esters, sulfonic acids, sulfonic acid esters, vinyl sulfonic acids, vinylphosphonic acids, catechol, silanes and the silanols and/or siloxanes formed therefrom, triazines, thiazoles, thiazines, dithiazines, acetals, hemiacetals, quinones, saturated fatty acids, unsaturated fatty acids, alkyds, esters, polyesters, ethers, glycols, cyclic ethers, crown ethers, anhydrides, and of acetylacetones and beta-diketo groups, carbonyl groups, and hydroxyl groups.

Advantageously, Al, Cu, Fe, Mg, Ca, and/or Zn are selected as the cations that are/have been dissolved out from the metal surface and/or that are/have been added to the aqueous composition.

Particularly preferably, the aqueous composition and/or the organic coating produced therefrom contains at least one additive selected from additives composed of the group of biocides, dispersing agents, film-forming auxiliary agents, acidic and/or basic agents for adjusting the pH, thickeners, and leveling agents.

Especially preferably, the metallic surfaces are cleaned, pickled, and/or pre-treated before the metal surfaces are contacted and coated with an aqueous composition in a method stage II.

Advantageously, the aqueous composition forms a coating based on an ionogenic gel, with which the dry film formed thereby or formed later has a thickness of at least 1 µm. Particularly preferably, the organic coating is formed in the dipping bath in 0.05 to 20 minutes and has a dry film thickness in the range of 5 to 100 µm after drying.

The invention further relates to an aqueous composition which, in a dispersion of film-forming polymers and/or a suspension of film-forming inorganic particles having a solid-content of 2 to 40 wt % and a mean particle size of 10 to 1,000 nm, contains at least one anionic polyelectrolyte in an amount of 0.01 to 5.0 wt % based on the total mass of the resulting mixture, wherein the aqueous composition has a pH value in the range of 4 to 11.

Preferably, the aqueous composition is one which, in the dispersion of film-forming polymers, comprises: a content of organic particles based on polyacrylates, polyurethanes, polyepoxides, and/or hybrids thereof; a content of at least one complexing agent selected from those based on maleic acid, alendronic acid, itaconic acid, citraconic acid, or mesaconic or anhydrides or half esters of these carboxylic acids; and at least one anionic polyelectrolyte based on pectins or gellan gum.

It has been found that from the surfaces coated according to the invention, it is then possible to produce substantially unbroken or unbroken coatings having a layer thickness in the range of 5 nm to 50 µm, in particular in the range of 10 nm to 40 µm, preferably from 15 nm to 1 µm. The individual coatings may have appropriate layer thicknesses before and/or after the filming thereof and/or before the cross-linking thereof.

It has been found that the surfaces coated according to the invention, from which substantially unbroken or unbroken coatings have then been produced, could be produced in a significantly simpler and significantly more inexpensive manner than, for example, electrodeposition or autodeposition dip coating or powder coatings.

Furthermore, it has been shown that such coatings produced according to the invention can be equivalent in their properties to those of electrodeposition or autodeposition dip coatings or powder coatings of modern industrial practice.

It has been unexpectedly ascertained that the method according to the invention, which is a method that is substantially non-electrolytic or is non-electrolytic, even in the event that it is negligibly supported with an electrical voltage and it therefore usually does not require the application of any external electrical voltage, can be operated in a simple manner and without complex control. This method can be used in a wide temperature range and even at room temperature, if apart from the subsequent drying.

It was surprisingly ascertained that in the method according to the invention, the application of the application agent does not necessitate complicated control measures in order to achieve a uniform and homogeneous coating, and that high-quality protective subsequent coatings, which achieve a thickness in the range of 500 nm to 30 µm, are formed with low chemical consumption.

It was surprisingly ascertained that in the method according to the invention, the deposition of, in particular, the subsequent coating is a self-regulating process which does not require any complex control measures and with which high-quality protective coatings are formed with low chemical consumption.

It was surprisingly ascertained that the subsequent coatings deposited according to the invention a homogeneous layer having a uniform dry film thickness on a complexly shaped workpiece, in a manner comparable to the quality of a coat layer deposited conventionally in an electrophoretic or autodeposited manner.

The coating according to the invention can preferably be used for coated substrates as a wire, wire mesh, tape, sheet, profile, panel, part of a vehicle or projectile, an element for a household appliance, an element in construction, rack, a crash barrier element, a heater element, or a fencing element, a molded part of complicated geometry or hardware such as a screw, nut, flange, or spring. Particularly preferably, the coating according to the invention is used in the automotive industry, in construction, for apparatus engineering, for household appliances, or in heating. The use of the method according to the invention is particularly preferred for coating substrates, which have caused problems in coating with an electrodeposition coating.

The invention shall be described in greater detail below by 16 examples and two comparatively examples. The substrates that are used in step I here are:

1. An electrolytically galvanized steel sheet having a zinc coating layer of 5 μm and a sheet thickness of 0.81 mm;
2. cold-rolled steel, with a sheet thickness of about 0.8 mm;
3. aluminum alloy of grade AC 170, sheet thickness about 1.0 mm; and the following general treatment steps were carried out:

II. Alkaline Cleaning:

Industrial alkaline cleaner, e.g., 30 g/L of Gardoclean® S 5176 and 4 g/L Gardobond® Additive H 7406 from Chemetall GmbH, in water, preferably prepared in tap or drinking water quality. The sheets were cleaned for 180 sec in spraying at 60° C., and then rinsed for 120 sec with city water and 120 sec with deionized water in dipping.

III. Coating of the Surfaces with Dispersions According to the Invention, for Forming the Organic Coating:
Composition of the Dispersion A

| DPE dispersion with maleic acid | |
|---|---|
| $nfA_{theoretical}$ = 40% | $nfA_{experimental}$ = 39% |
| Chemical | [g] |
| Stage 1 | |
| $H_2O$ | 770 |
| $NH_3$ (25%) | 6.24 |
| MS | 5.06 |
| DPE | 2.0531 |
| MMA | 25.05 |
| APS | 3.12 |
| $H_2O$ | 67.6 |
| Stage 2 | |
| BMA | 500 |
| HEMA | 25 |

Abbreviations $NH_3$ ammonia solution (25%)
AS: Acrylic acid
DPE: Diphenylethylene
MMA: Methyl methacrylate
APS: Ammonium persulfate
BMA: Butyl methacrylate
HEMA: Hydroxyethyl methacrylate
MS: Maleic acid
VTES: Vinyltriethoxysilane
nfA non-volatile content (equivalent to solid content)
Dispersion B An anionically stabilized dispersion having a film-forming temperature of 25° C., a solid content of 49 to 51%, a pH of 7.0 to 8.0, a viscosity of 20 to 200 mPas, a density of 1.04 g/cm3, a particle size of about 160 nm, and −14 to −18 mV. The dispersion was adjusted to a solid content of 10% with demineralized water for the further treatment process.

For the comparative examples 1 to 3, the dispersion A was used alone, without the addition of the polyelectrolytes that are relevant for the use according to the invention. The mixture was adjusted, where necessary to a pH of 4 with acid, preferably nitric acid and/or phosphoric acid, prior to use. For the comparative examples 4 to 6, solely the polyelectrolytes that are relevant for the use according to the invention were used. In comparative Examples 7 to 9 were IV: Rinsing of the Organic Coating:

Rinsing after the organic coating serves to remove non-adhered components of the formulation and accumulations of the formulation, and to make the method process as realistic as possible as what is typical in the automotive industry. In the automotive industry, the rinsing with water is typically performed either by an immersion rinse or a spray rinse.

V: Drying and/or Cross-Linking of the Coating:

Drying, or drying under film formation, in particular of the organic polymeric components: 175° C. for 15 minutes Parallel analyses with eddy current measuring and scanning electron microscopy (SEM) have made it clear that coatings according to the invention were formed, from which largely unbroken or unbroken coatings could be formed by contacting the surfaces with dispersions and/or formulations.

EXAMPLE 1

The substrate 1 was mixed with a mixture of 0.25% wt % based on the total amount of the resulting mixture with a pectin having a molecular weight of about 70,000 g/mol, a degree of amidation of 0%, a degree of esterification of 52%, a degree of epoxidation of 0%, and a galacturonic acid content of 87%, and 0.25% wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the previously described dispersion A. 2.0 g/L of 20% hexafluorozirconic acid was added to the mixture. A dry film thickness of 55 to 65 μm was measured, as determined with an eddy current meter and SEM.

EXAMPLE 2

Experiment 1 was repeated with a substrate 2, and a dry film thickness of 15 to 25 μm was determined with SEM.

EXAMPLE 3

Experiment 1 was repeated with a substrate 3, and a dry film thickness of 3 to 4 μm was determined with SEM.

EXAMPLE 4

The substrate 1 was mixed with a mixture of 0.25 wt %, based on the total amount of the resulting mixture, of a pectin having a molecular weight of about 70,000 g/mol, a degree of amidation of 0%, a degree of esterification of 52%, a degree of epoxidation of 0%, and a galacturonic acid content of 87%, and 0.25 wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the previously described dispersion A. 4.0 g/L of 20% hexafluorozirconic acid was added to the mixture. A dry film thickness of 63 to 67 μm was measured, as determined with an eddy current meter and SEM.

EXAMPLE 5

Experiment 4 was repeated with a substrate 2, and a dry film thickness of 10 to 20 μm was determined with SEM.

EXAMPLE 6

Experiment 4 was repeated with a substrate 3, and a dry film thickness of 4 to 5 µm was determined with SEM.

EXAMPLE 7

The substrate 1 was mixed with a mixture of 0.25 wt %, based on the total amount of the resulting mixture, of a pectin having a molecular weight of about 70,000 g/mol, a degree of amidation of 0%, a degree of esterification of 52%, a degree of epoxidation of 0%, and a galacturonic acid content of 87%, and 0.25 wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the previously described dispersion A. 6.0 g/L of 20% hexafluorozirconic acid was added to the mixture. A dry film thickness of 70 to 85 µm was measured, as determined with an eddy current meter and SEM.

EXAMPLE 8

Experiment 7 was repeated with a substrate 2, and a dry film thickness of 5 to 7 µm was determined with SEM.

EXAMPLE 9

Experiment 7 was repeated with a substrate 3, and a dry film thickness of 5 to 6 µm was determined with SEM.

EXAMPLE 10

The substrate 2 was mixed with a mixture of 0.25% wt %, based on the total amount of the resulting mixture, of a pectin having a molecular weight of about 70,000 g/mol, a degree of amidation of 0%, a degree of esterification of 52%, a degree of epoxidation of 0%, and a galacturonic acid content of 87%, and 0.25% wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the previously described dispersion A. 8.0 g/L of 20% hexafluorozirconic acid was added to the mixture. A dry film thickness of 5 to 10 µm was measured, as determined with an eddy current meter and SEM.

EXAMPLE 11

Experiment 10 was repeated with a substrate 3, and a dry film thickness of 7 to 8 µm was determined with SEM.

EXAMPLE 12

The substrate 3 was mixed with a mixture of 0.25 wt %, based on the total amount of the resulting mixture, of a pectin having a molecular weight of about 70,000 g/mol, a degree of amidation of 0%, a degree of esterification of 52%, a degree of epoxidation of 0%, and a galacturonic acid content of 87%, and 0.25 wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the previously described dispersion A. 10.0 g/L of 20% hexafluorozirconic acid was added to the mixture. A dry film thickness of 8 to 9 µm was measured, as determined with an eddy current meter and SEM.

EXAMPLE 13

The substrate 3 was mixed with a mixture of 0.25 wt %, based on the total amount of the resulting mixture, of a pectin having a molecular weight of about 70,000 g/mol, a degree of amidation of 0%, a degree of esterification of 52%, a degree of epoxidation of 0%, and a galacturonic acid content of 87%, and 0.25 wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the previously described dispersion A. 14.0 g/L of 20% hexafluorozirconic acid was added to the mixture. A dry film thickness of 16 to 21 µm was measured, as determined with an eddy current meter and SEM.

EXAMPLE 14

The substrate 3 was mixed with a mixture of 0.25 wt %, based on the total amount of the resulting mixture, of a pectin having a molecular weight of about 70,000 g/mol, a degree of amidation of 0%, a degree of esterification of 52%, a degree of epoxidation of 0%, and a galacturonic acid content of 87%, and 0.25 wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the previously described dispersion A. 24.0 g/L of 20% hexafluorozirconic acid was added to the mixture. A dry film thickness of 20 to 22 µm was measured, as determined with an eddy current meter and SEM.

EXAMPLE 15

The substrate 3 was mixed with a mixture of 0.25 wt %, based on the total amount of the resulting mixture, of a pectin having a molecular weight of about 70,000 g/mol, a degree of amidation of 0%, a degree of esterification of 52%, a degree of epoxidation of 0%, and a galacturonic acid content of 87%, and 0.25 wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the previously described dispersion A. 44.0 g/L of 20% hexafluorozirconic acid was added to the mixture. A dry film thickness of 24 µm was measured, as determined with an eddy current meter and SEM.

EXAMPLE 16

The substrate 1 was mixed with 0.25 wt %, based on the total amount of the resulting mixture, of a pectin having a molecular weight of about 70,000 g/mol, a degree of amidation of 0%, a degree of esterification of 52%, a degree of epoxidation of 0%, and a galacturonic acid content of 87%, and 0.25 wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the dispersion A. 1.0 g/L of 20% hexafluorotitanic acid was added to the mixture. A dry film thickness of 52 to 55 μm was measured, as determined with an eddy current meter and SEM.

EXAMPLE 17

Experiment 16 was repeated with a substrate 2, and a dry film thickness of 18 to 24 μm was determined with SEM.

EXAMPLE 18

Experiment 16 was repeated with a substrate 3, and a dry film thickness of 6 to 7 μm was determined with SEM.

EXAMPLE 19

The substrate 1 was mixed with a mixture of 25% wt %, based on the total amount of the resulting mixture, of a pectin having a molecular weight of about 70,000 g/mol, a degree of amidation of 0%, a degree of esterification of 52%, a degree of epoxidation of 0%, and a galacturonic acid content of 87%, and 0.25% wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the dispersion A. 2.0 g/L of 20% hexafluorotitanic acid was added to the mixture. A dry film thickness of 60 to 70 μm was measured, as determined with an eddy current meter and SEM.

EXAMPLE 20

Experiment 19 was repeated with a substrate 2, and a dry film thickness of 20 to 22 μm was determined with SEM.

EXAMPLE 21

Experiment 19 was repeated with a substrate 3, and a dry film thickness of 8 to 9 μm was determined with SEM.

EXAMPLE 22

The substrate 1 was mixed with a mixture of 0.25 wt %, based on the total amount of the resulting mixture, of a pectin having a molecular weight of about 70,000 g/mol, a degree of amidation of 0%, a degree of esterification of 52%, a degree of epoxidation of 0%, and a galacturonic acid content of 87%, and 0.25 wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the dispersion A. 4.0 g/L of 20% hexafluorotitanic acid was added to the mixture. A dry film thickness of 67 to 73 μm was measured, as determined with an eddy current meter and SEM.

EXAMPLE 23

Experiment 22 was repeated with a substrate 2, and a dry film thickness of 6 to 11 μm was determined with SEM.

EXAMPLE 24

Experiment 22 was repeated with a substrate 3, and a dry film thickness of 8 to 10 μm was determined with SEM.

EXAMPLE 25

The substrate 1 was mixed with a mixture of 0.25 wt %, based on the total amount of the resulting mixture, of a pectin having a molecular weight of about 70,000 g/mol, a degree of amidation of 0%, a degree of esterification of 52%, a degree of epoxidation of 0%, and a galacturonic acid content of 87%, and 0.25 wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the dispersion A. 6.0 g/L of 20% hexafluorotitanic acid was added to the mixture. A dry film thickness of 70 to 90 μm was measured, as determined with an eddy current meter and SEM.

EXAMPLE 26

Experiment 25 was repeated with a substrate 2, and a dry film thickness of 6 to 12 μm was determined with SEM.

EXAMPLE 27

Experiment 25 was repeated with a substrate 3, and a dry film thickness of 7 to 9 μm was determined with SEM.

EXAMPLE 28

The substrate 3 was mixed with a mixture of 0.25 wt %, based on the total amount of the resulting mixture, of a pectin having a molecular weight of about 70,000 g/mol, a degree of amidation of 0%, a degree of esterification of 52%, a degree of epoxidation of 0%, and a galacturonic acid content of 87%, and 0.25 wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the above dispersion A. 8.0 g/L of 20% hexafluorotitanic acid was added to the mixture. A dry film thickness of 8 to 11 μm was measured, as determined with an eddy current meter and SEM.

EXAMPLE 29

The substrate 3 was mixed with a mixture of 0.25 wt %, based on the total amount of the resulting mixture, of a pectin having a molecular weight of about 70,000 g/mol, a degree of amidation of 0%, a degree of esterification of 52%, a degree of epoxidation of 0%, and a galacturonic acid content of 87%, and 0.25 wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the dispersion A. 10.0 g/L of 20% hexafluorotitanic acid was added to the mixture. A dry film thickness of 8 to 12 μm was measured, as determined with an eddy current meter and SEM.

EXAMPLE 30

The substrate 3 was mixed with a mixture of 0.25 wt %, based on the total amount of the resulting mixture, of a pectin having a molecular weight of about 70,000 g/mol, a degree of amidation of 0%, a degree of esterification of 52%, a degree of epoxidation of 0%, and a galacturonic acid content of 87%, and 0.25 wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the dispersion A. 14.0 g/L of 20% hexafluorotitanic acid was added to the mixture. A dry film thickness of 9 to 11 µm was measured, as determined with an eddy current meter and SEM.

EXAMPLE 31

The substrate 3 was mixed with a mixture of 0.25 wt %, based on the total amount of the resulting mixture, of a pectin having a molecular weight of about 70,000 g/mol, a degree of amidation of 0%, a degree of esterification of 52%, a degree of epoxidation of 0%, and a galacturonic acid content of 87%, and 0.25 wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the above dispersion A. 24.0 g/L of 20% hexafluorotitanic acid was added to the mixture. A dry film thickness of 12 to 17 µm was measured, as determined with an eddy current meter and SEM.

EXAMPLE 32

The substrate 3 was mixed with a mixture of 0.25 wt %, based on the total amount of the resulting mixture, of a pectin having a molecular weight of about 70,000 g/mol, a degree of amidation of 0%, a degree of esterification of 52%, a degree of epoxidation of 0%, and a galacturonic acid content of 87%, and 0.25 wt %, based on the total amount of the resulting mixture, of a pectin having a molecular weight of about 70,000 g/mol, a degree of amidation of 0%, a degree of esterification of 10%, a degree of epoxidation of 0%, and a galacturonic acid content of 85%, with 99.5 wt % of the above dispersion A. 44.0 g/L of 20% hexafluorotitanic acid was added to the mixture. A dry film thickness of 16 to 24 µm was measured, as determined with an eddy current meter and SEM.

EXAMPLE 33

The substrate 1 was mixed with a mixture of 0.5 wt %, based on the total amount of the resulting mixture, of a chitosan having a degree of diacetylation between 65% and 85% dissolved in 1% acetic acid, and with 99.5 wt % of the dispersion A. 2.8 g/L of 20% hexafluorozirconic acid was added to the mixture. A dry film thickness of 4 to 6 µm was measured, as determined with an eddy current meter and SEM.

EXAMPLE 34

The substrate 1 was mixed with a mixture of 0.5% wt %, based on the total amount of the resulting mixture, of a chitosan having a degree of diacetylation between 75% and 85% dissolved in 1% acetic acid, and with 99.5 wt % of the dispersion B. 2.4 g/L of 20% hexafluorozirconic acid was added to the mixture. A dry film thickness of 45 to 50 µm was measured, as determined with an eddy current meter and SEM.

EXAMPLE 35

Experiment 35 was repeated with a substrate 3, and a dry film thickness of 3 to 4 µm was determined with SEM.

EXAMPLE 33

The substrate 1 was mixed with a mixture of 0.5 wt %, based on the total amount of the resulting mixture, of a gellan gum having a molecular weight of about 70,000 g/mol and a low acyl content with 99.5 wt % of the above dispersion A. 2.0 g/L of 20% hexafluorozirconic acid was added to the mixture. A dry film thickness of 5 to 6 µm was measured, as determined with an eddy current meter and SEM.

EXAMPLE 34

Experiment 33 was repeated with a substrate 2, and a dry film thickness of 7 to 8 µm was determined with SEM.

EXAMPLE 35

Experiment 33 was repeated with a substrate 3, and a dry film thickness of 7 to 8 µm was determined with SEM.

COMPARATIVE EXAMPLE 1

The substrate 1 was coated with the dispersion A. A dry film thickness was not determined by SEM.

COMPARATIVE EXAMPLE 2

The substrate 2 was coated with the dispersion A. A dry film thickness was not determined by SEM.

COMPARATIVE EXAMPLE 3

The substrate 3 was coated with the dispersion A. A dry film thickness was not determined by SEM.

COMPARATIVE EXAMPLE 4

The coating of the substrate 1 with the polyelectrolytes referred to in the description of the invention, without mixture with the dispersion A, resulted in a dry film thickness of 300 to 500 nm.

COMPARATIVE EXAMPLE 5

The coating of the substrate 2 with the polyelectrolytes referred to in the description of the invention, without mixture with the dispersion A, resulted in a dry film thickness of 300 to 500 nm.

COMPARATIVE EXAMPLE 6

The coating of the substrate 3 with the polyelectrolytes referred to in the description of the invention, without mixture with the dispersion A, resulted in a dry film thickness of 300 to 500 nm.

The microscope images consistently show a homogeneous layer formation, indicating a reliable, self-regulating, and readily controllable coating method.

The invention claimed is:

1. An aqueous composition, the composition comprising:

at least one anionic polyelectrolyte in a quantity of 0.01 to 5.0 wt % based on the total mass of the aqueous composition;

a complex fluoride selected from the group consisting of hexa- or tetrafluorides of cations of titanium, zirconium, hafnium, silicon, aluminum, and/or boron in an amount of $1.1 \times 10^{-6}$ mol/l to 0.30 mol/l based on the cations of the complex fluoride;

a content of organic particles based on polyacrylates, polyurethanes, polyepoxides, and/or hybrids thereof;

a content of at least one complexing agent selected from the group consisting of complexing agents based on maleic acid, alendronic acid, itaconic acid, citraconic acid, mesaconic acid, and anhydrides or semi-esters of these carboxylic acids; and the at least one anionic polyelectrolyte is based on gellan gum;

wherein the composition is in the form of an anionically stabilized dispersion made of film-forming polymers, said dispersion comprising a solid content of 2 to 40 wt % and a mean particle size of 10 to 1,000 nm, said dispersion being stable in the pH value range of 0.5 to 7.0.

* * * * *